United States Patent
Guo et al.

(10) Patent No.: US 9,812,857 B2
(45) Date of Patent: Nov. 7, 2017

(54) SHORT-CIRCUIT PROTECTION METHOD AND DEVICE FOR A HALF-BRIDGE RESONANT CONVERTER

(71) Applicant: ZTE CORPORATION, Shenzhen, Guangdong (CN)

(72) Inventors: Xiaoliang Guo, Shenzhen (CN); Shenghua Bao, Shenzhen (CN); Tao Wang, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 14/762,974

(22) PCT Filed: Mar. 11, 2014

(86) PCT No.: PCT/CN2014/073248
§ 371 (c)(1),
(2) Date: Jul. 23, 2015

(87) PCT Pub. No.: WO2014/139414
PCT Pub. Date: Sep. 18, 2014

(65) Prior Publication Data
US 2016/0172843 A1    Jun. 16, 2016

(30) Foreign Application Priority Data

Mar. 12, 2013  (CN) .......................... 2013 1 0078294

(51) Int. Cl.
*H02H 7/122*  (2006.01)
*H02H 7/12*  (2006.01)
(Continued)

(52) U.S. Cl.
CPC ............ *H02H 7/1213* (2013.01); *H02M 1/32* (2013.01); *H02M 3/3376* (2013.01);
(Continued)

(58) Field of Classification Search
CPC ........ H02H 1/04; H02H 3/023; H02H 7/1227; H02H 7/1257; H02H 7/10; H02H 7/1213;
(Continued)

(56) References Cited

U.S. PATENT DOCUMENTS

| 7,558,037 B1 | 7/2009 | Gong et al. |
| 2005/0036245 A1 | 2/2005 | Greenfeld |

(Continued)

FOREIGN PATENT DOCUMENTS

| CN | 101605422 A | 12/2009 |
| CN | 101860001 A | 10/2010 |

(Continued)

OTHER PUBLICATIONS

Extended European Search Report in European for corresponding European Patent Application No. 14763142.8 (dated Apr. 1, 2016).

(Continued)

*Primary Examiner* — Alex Torres-Rivera
(74) *Attorney, Agent, or Firm* — LeClairRyan, a Professional Corporation

(57) ABSTRACT

Provided are a short-circuit protection method and device for a half-bridge resonance converter. The method includes: a secondary-side current signal of the half-bridge resonance converter is detected, and the detected secondary-side current signal is converted into a corresponding first sampling voltage signal; whether a cycle-by-cycle protection is required in accordance with the first sampling voltage signal is determined; and a driving signal of the half-bridge resonance converter is compulsorily blocked during a preset cycle, if the cycle-by-cycle protection is required. Short-circuit protection may be performed for the half-bridge resonance converter, meanwhile a power density of the half-bridge resonance converter is satisfied.

6 Claims, 6 Drawing Sheets

(51) Int. Cl.
  *H02M 3/337* (2006.01)
  *H02M 1/32* (2007.01)
  *H02M 3/335* (2006.01)
  *H02M 1/00* (2006.01)
(52) U.S. Cl.
  CPC ............ *H02M 3/33546* (2013.01); *H02M 2001/0058* (2013.01); *Y02B 70/1433* (2013.01); *Y02B 70/1491* (2013.01)
(58) Field of Classification Search
  CPC ........ H02M 7/062; H02M 1/092; H02M 1/32; H02M 1/38; H02M 3/33546; H02M 3/3376; Y02B 70/1433
  USPC ............................ 363/21.02, 21.03, 50–56.11
  See application file for complete search history.

(56) References Cited

U.S. PATENT DOCUMENTS

| | | | | |
|---|---|---|---|---|
| 2008/0019153 | A1* | 1/2008 | Adragna | H02M 1/32 363/17 |
| 2011/0175587 | A1 | 7/2011 | Hosotani | |
| 2011/0228566 | A1* | 9/2011 | Liang | H02M 1/32 363/21.02 |
| 2011/0305044 | A1* | 12/2011 | Huang | H02M 7/53806 363/21.02 |
| 2013/0114307 | A1* | 5/2013 | Fang | H02M 1/32 363/21.01 |
| 2013/0343096 | A1* | 12/2013 | Stuler | H02M 1/32 363/21.02 |

FOREIGN PATENT DOCUMENTS

| | | |
|---|---|---|
| CN | 101895201 A | 11/2010 |
| CN | 101902139 A | 12/2010 |
| CN | 101931316 A | 12/2010 |
| CN | 102063872 A | 5/2011 |
| CN | 102223064 A | 10/2011 |
| CN | 202268685 U | 6/2012 |
| CN | 103219705 A | 7/2013 |
| JP | 3507357 B2 | 3/2004 |

OTHER PUBLICATIONS

International Search Report in international application No. PCT/CN2014/073248, dated Jun. 18, 2014.
English Translation of the Written Opinion of the International Search Authority in international application No. PCT/CN2014/073248, dated Jun. 18, 2014.
Research on LLC Resonant Switching Converter, Jun. 30, 2011.
Glaser, Chris, "Extending the Soft Start Time in the TPS6107x Family of Boost Converters", Feb. 28, 2013, XP055377260, Retrieved from the Internet: URL://www.ti.com/lit/an/slva307a/slva307a.pdf, retrieved on May 30, 2017.
European Office Action for EP Application No. 14763142.8, dated Jun. 8, 2017, p. 1-8.

\* cited by examiner

SHORT-CIRCUIT PROTECTION METHOD AND DEVICE FOR A HALF-BRIDGE RESONANT CONVERTER

This application is a national stage application under 35 U.S.C. §371 from PCT Application No. PCT/CN2014/073248, filed Mar. 11, 2014, which claims the priority benefit of China Application No. 201310078294.5, filed Mar. 12, 2013.

TECHNICAL FIELD

The present disclosure relates to the field of switching power supply, and in particular to a short-circuit protection method and device for a half-bridge resonance converter.

BACKGROUND

High power density is an important developing trend for power electronic products, especially for communication power supply products. A half-bridge LLC resonance DC/DC topology has a prominent advantage in terms of conversion efficiency and power density for medium and low power levels, therefore, it is widespread in telecommunication power supply products. With the development of the products, the degree of difficulty to improve the power density becomes greater. Reducing the number of components is a preliminary means other than production of new components and new arts.

As shown in FIG. 1, the industry depends on a primary side peak circuit sampling and a limited current circuit to complete a half-bridge LLC resonance DC/DC converter. The solution has advantages such as simpleness, quickness and high dependability. However, to meet the requirement of high power density, an extra primary side current sampling unit (normally it is implemented by a current transformer) occupies a lot of spaces. In addition, when safety distance is taken into consideration, certain difficulty is brought to the PCB layout and sketch pad.

SUMMARY

The major technical problem the present disclosure is intended to solve is to provide a short-circuit protection method and device for a half-bridge resonance converter, which can realize the short-circuit protection for a half-bridge resonance converter, meanwhile can improve power density of the half-bridge resonance converter.

To this end, the present disclosure provides a short-circuit protection method for a half-bridge resonance converter, including following steps:

detecting a secondary-side current signal of the half-bridge resonance converter, and converting the secondary-side current signal into a first sampling voltage signal;

determining whether a cycle-by-cycle protection is required in accordance with the first sampling voltage signal; and compulsorily blocking a driving signal of the half-bridge resonance converter during a preset cycle, when the cycle-by-cycle protection is required.

Furthermore, the determining whether a cycle-by-cycle protection is required in accordance with the first sampling voltage signal may include:

performing difference and amplification processing on the first sampling voltage signal;

comparing a voltage value of the first sampling voltage signal after the difference and amplification processing with a preset voltage value; and determining that the cycle-by-cycle protection is required, when the voltage value of the first sampling voltage signal after the difference and amplification processing is greater than the preset voltage value.

Furthermore, after converting the detected secondary-side current signal into the first sampling voltage signal, the method may further include: processing the first sampling voltage signal and acquiring an average voltage signal corresponding to an average secondary-side current signal;

after determining whether the cycle-by-cycle protection is required in accordance with the first sampling voltage signal, the method may further include: generating a given voltage signal with a fixed voltage value, when determining that the cycle-by-cycle protection is required in accordance with the first sampling voltage signal;

after compulsorily blocking the driving signal of the half-bridge resonance converter during the preset cycle, the method may further include: acquiring a loop control signal according to the average voltage signal and the given voltage signal; and controlling a size of the driving signal of the half-bridge resonance converter according to the loop control signal.

Furthermore, the short-circuit protection method may further include:

detecting an output voltage signal of the half-bridge resonance converter, and converting the output voltage signal into a second sampling voltage signal;

after determining whether the cycle-by-cycle protection is required in accordance with the first sampling voltage signal, the method may further include:

generating a given voltage signal in accordance with the second sampling voltage signal, when determining the cycle-by-cycle protection is not required; and controlling the driving signal of the half-bridge resonance converter according to the given voltage signal so as to steady the output voltage signal of the half-bridge resonance converter.

Furthermore, the acquiring a loop control signal according to the average voltage signal and the given voltage signal may include:

performing calculation and compensation processing on the average voltage signal and the given voltage signal, and acquiring the loop control signal.

Likewise, to solve the aforementioned technical problem, the present disclosure further provides a short-circuit protection device for a half-bridge resonance converter, including a current sampling circuit, a determining circuit and a driving control circuit;

the current sampling circuit is configured to detect a secondary-side current signal of the half-bridge resonance converter, and convert the secondary-side current signal into a first sampling voltage signal;

the determining circuit is configured to determine whether a cycle-by-cycle protection is required in accordance with the first sampling voltage signal; and the driving control circuit is configured to compulsorily block a driving signal of the half-bridge resonance converter during a preset cycle, when the determining circuit determines that the cycle-by-cycle protection is required.

Furthermore, the determining circuit may include a first signal processing circuit and a comparison circuit;

the first signal processing circuit is configured to perform difference processing and amplification processing on the first sampling voltage signal;

the comparison circuit is configured to compare a voltage value of the first sampling voltage signal after the difference and amplification processing with a preset voltage value, and determine that the cycle-by-cycle protection is required, when voltage value of the first sampling voltage signal processed by the first signal processing circuit is greater than the preset voltage value.

Furthermore, the short-circuit protection device for a half-bridge resonance converter may further include a voltage-signal given circuit, a second signal processing circuit and a loop control circuit;

the second signal processing circuit is configured to process the first sampling voltage signal and acquire an average voltage signal corresponding to an average secondary-side current signal;

the voltage-signal given circuit is configured to generate a given voltage signal with a fixed voltage value, when the determining circuit determines that the cycle-by-cycle protection is required;

the loop control circuit is configured to acquire a loop control signal according to the average voltage signal and the given voltage signal; and the driving control circuit is further configured to control a size of the driving signal of the half-bridge resonance converter according to the loop control signal.

Furthermore, the short-circuit protection device for a half-bridge resonance converter may further include a voltage sampling circuit;

the voltage sampling circuit is configured to detecting an output voltage signal of the half-bridge resonance converter, and converting the output voltage signal into a second sampling voltage signal;

the voltage-signal given circuit is further configured to generate a given voltage signal according to the second sampling voltage signal, when the determining circuit determines that the cycle-by-cycle protection is not required; and the driving control circuit is further configured to control the driving signal of the half-bridge resonance converter according to the given voltage signal so as to steady the output voltage signal of the half-bridge resonance converter.

Furthermore, the loop control circuit may include a calculating sub-circuit and a compensation sub-circuit;

the calculating sub-circuit is configured to calculate the average voltage signal and the given voltage signal and to transmit voltage signals after the calculation to the compensation sub-circuit; and the compensation sub-circuit is configured to perform compensation processing on the voltage signals after the calculation and to acquire the loop control signal.

The beneficial effects of the present disclosure hereinafter are as follows:

the embodiments provide a short-circuit protection method and device for a half-bridge resonance converter, which can realize the short-circuit protection for the half-bridge resonance converter, and can improve power density of the half-bridge resonance converter; where the short-circuit protection method includes detecting a secondary-side current signal of the half-bridge resonance converter, and converting the detected secondary-side current signal into a corresponding first sampling voltage signal; determining whether a cycle-by-cycle protection is required in accordance with the first sampling voltage signal; and compulsorily blocking a driving signal of the half-bridge resonance converter during a preset cycle, for example, compulsorily blocking a driving signal of the half-bridge resonance converter during a current cycle, when the cycle-by-cycle protection is required. The method realizes functions of a short-circuit protection method by secondary-side current sampling and peak cycle-by-cycle protection. The secondary-side current sampling is necessary for all switching power supplies. In contrast to conventional short-circuit protection solutions that are normally used, the method reduces the current sampling of the primary side and sufficiently takes advantage of the current sampling of the secondary-side, reducing the number of components and hence improving the power density.

DETAILED DESCRIPTION

Detailed description of embodiments in combination of drawings is provided hereinafter.

Embodiment One

Figure 1:
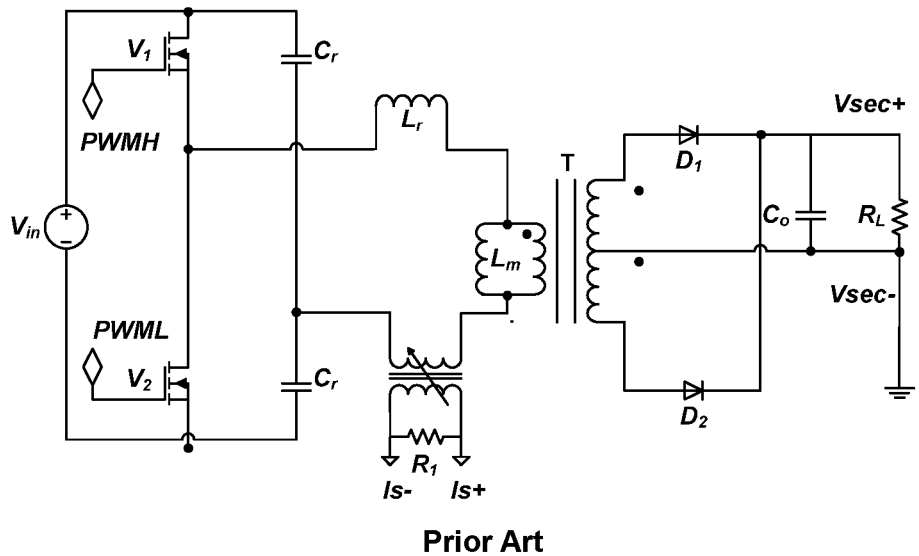
FIG. 1 is a circuit diagram of a half-bridge resonance converter according to the prior art.
Figure 2:
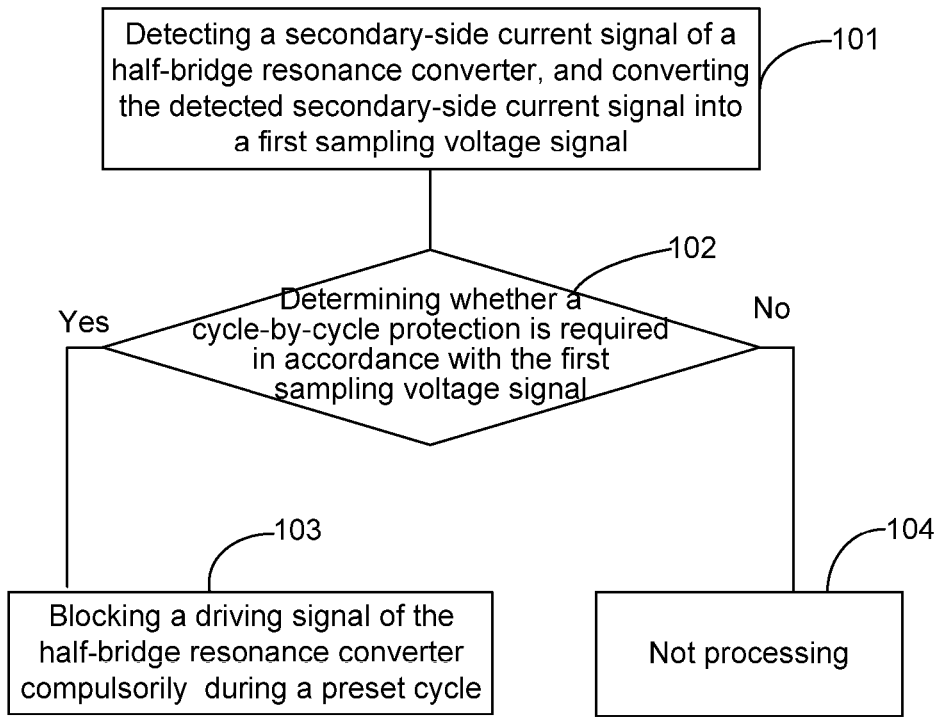
FIG. 2 is a flowchart of a short-circuit protection method for a half-bridge resonance converter provided by Embodiment one according to the present disclosure.

As shown in FIG. 2, a short-circuit protection method for a half-bridge resonance converter according to an embodiment includes that:

step 101: a secondary-side current signal of the half-bridge resonance converter is detected, and the detected secondary-side current signal is converted into a first sampling voltage signal;

step 102: whether a cycle-by-cycle protection is required is determined in accordance with the first sampling voltage signal; if the cycle-by-cycle protection is required, step 103 is executed; if not required, step 104 is executed;

step 103: a driving signal of the half-bridge resonance converter is compulsorily blocked during a preset cycle; and step 104: no processing is performed.

According to the embodiment, the short-circuit protection method for a half-bridge resonance converter realizes a peak cycle-by-cycle protection only by secondary-side current sampling and thus achieves the short-circuit protection. According to the short-circuit protection method in the embodiment, a driving signal of the half-bridge resonance converter can be compulsorily blocked during an interruption cycle so as to lower the secondary-side current, when the cycle-by-cycle protection for the half-bridge resonance converter is required and if the secondary-side current significantly increases and exceeds a preset threshold, thereby realizing the short-circuit protection. At the same time, the secondary-side current sampling is necessary for all switching power supplies. Therefore, the method according to the embodiment does not need original-side current sampling, but employs secondary-side current sampling in the current switching power supply to realize the short-circuit protection, which does not need to add components at the primary side and realizes the short-circuit protection by the primary side current sampling, thereby improving the power density.

In the above step 102, determining whether a cycle-by-cycle protection is required in accordance with the sampling voltage signal includes:

performing difference and amplification processing on the sampling voltage signal;

comparing a voltage value of the first sampling voltage signal after processing with a preset voltage value; and determining that the cycle-by-cycle protection is required, if the voltage value of the first sampling voltage signal after processing is greater than the preset voltage value.

When the half-bridge resonance converter is overloaded or in a short circuit condition, its secondary-side and output current increases significantly. The short-circuit protection method according to the embodiment may detect secondary-side current in real-time. When the secondary-side current increases, the voltage corresponding to the current also increases. The voltage signal is compared with the preset voltage threshold value; if the voltage value exceeds the preset voltage threshold, it indicates that, at the moment, the half-bridge resonance converter results in the secondary-side and output current due to faults or other reasons. At the moment, cycle-by-cycle protection is required at the half-bridge resonance converter, a driving signal of the half-bridge resonance converter is needed to be compulsorily blocked during a preset cycle, to reduce the secondary-side current and the output current, thereby realizing the short-circuit protection.

According to the embodiment, after compulsorily blocking the driving signal of the half-bridge resonance converter, the short-circuit protection method for a half-bridge resonance converter further includes a process of limiting currents that limits the output current of the half-bridge resonance converter, for example, limiting the output current to a fixed value. For the process of limiting currents, a procedure of the short-circuit protection method according to the embodiment is as follows:

after step 101, the method further includes that the first sampling voltage signal is processed and an average voltage signal corresponding to an average secondary-side current signal is acquired;

in step 102, after determining whether a cycle-by-cycle protection is required in accordance with the first sampling voltage signal, the method further includes that a given voltage signal with a fixed voltage value is generated, when determining that the cycle-by-cycle protection is required in accordance with the first sampling voltage signal;

after step 103, the method further includes:

a loop control signal is acquired according to the average voltage signal and the given voltage signal; and a size of the driving signal of the half-bridge resonance converter is controlled according to the loop control signal.

Figure 3:
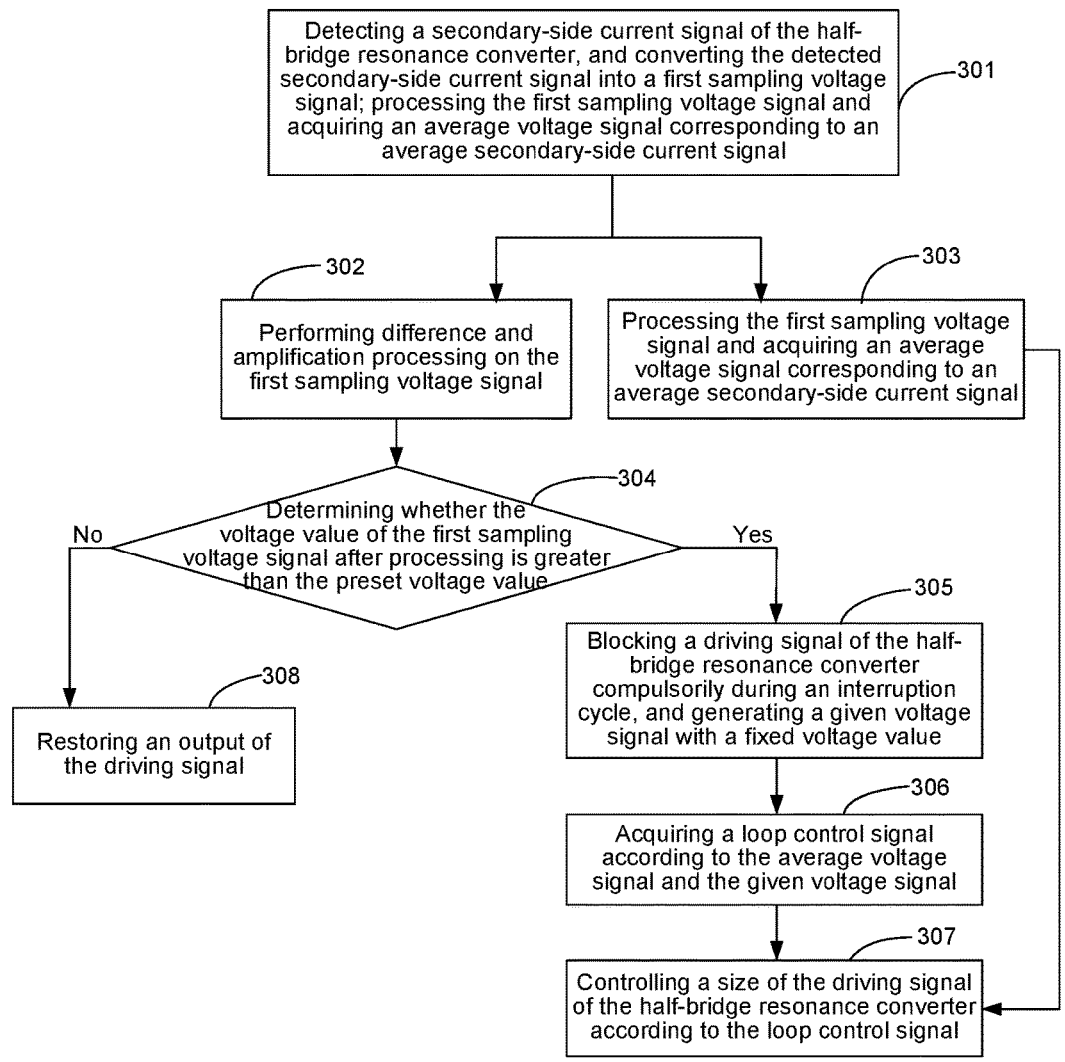
FIG. 3 is a flowchart of another short-circuit protection method for a half-bridge resonance converter provided by Embodiment one according to the present disclosure.

As shown in FIG. 3, the short-circuit protection method according to the embodiment, is described in detail hereinafter:

step 301: a secondary-side current signal of the half-bridge resonance converter is detected, and the detected secondary-side current signal is converted into a corresponding first sampling voltage signal; the first sampling voltage signal is processed and an average voltage signal corresponding to an average secondary-side current signal is acquired; then, step 302 and 303 are executed, respectively;

step 302: difference and amplification processing is performed on the first sampling voltage signal; step 304 is executed;

step 303: the first sampling voltage signal is processed and an average voltage signal corresponding to an average secondary-side current signal is acquired; step 306 is executed;

step 304: it is determined whether the voltage value of the first sampling voltage signal after processing is greater than the preset voltage value; if greater, step 305 is executed; if not greater, step 308 is executed;

step 305: a driving signal of the half-bridge resonance converter is compulsorily blocked during an interruption cycle, and a given voltage signal with a fixed voltage value is generated;

step 306: a loop control signal is acquired according to the average voltage signal and the given voltage signal;

step 307: a size of the driving signal of the half-bridge resonance converter is controlled according to the loop control signal; and step 308: an output of the driving signal is restored.

Figure 4:
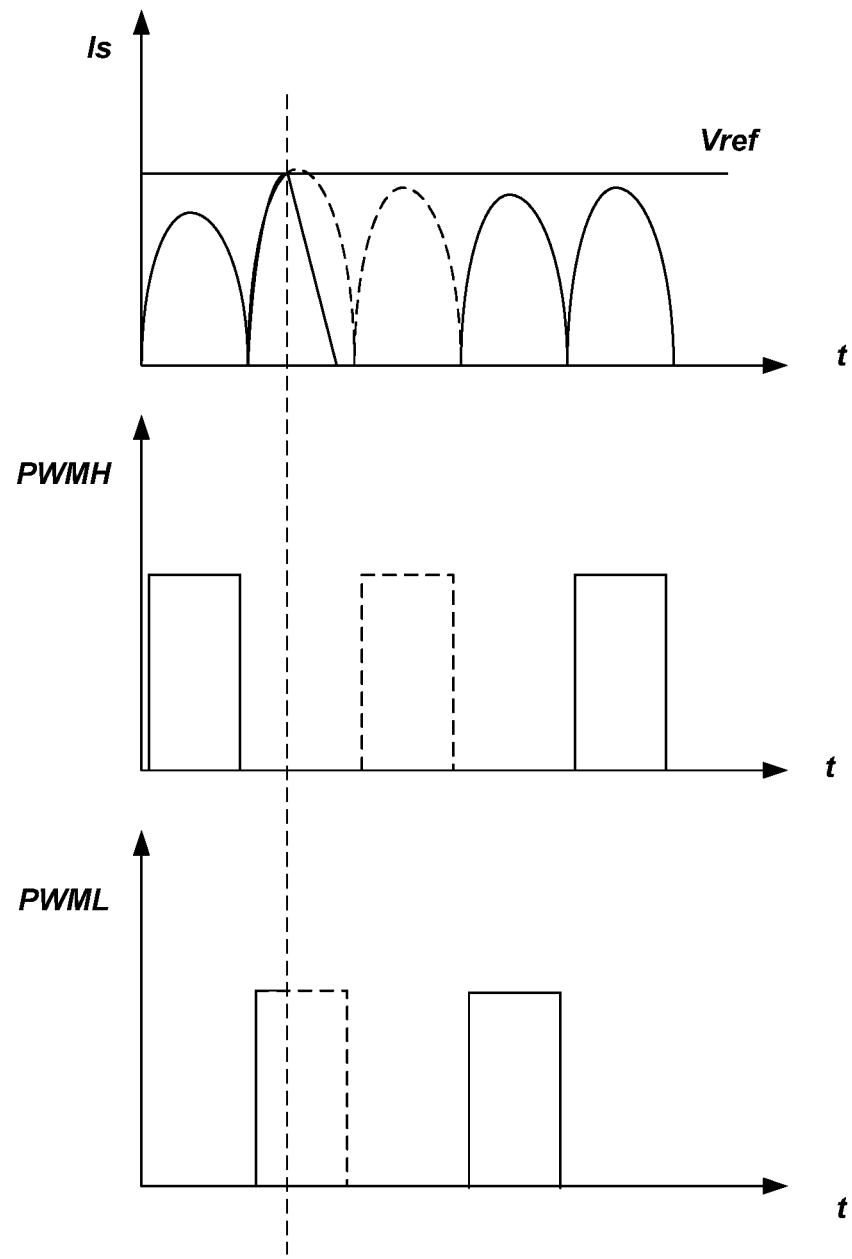
FIG. 4 is a changing diagram of a driving signal when there is a cycle-by-cycle protection according to Embodiment one of the present disclosure.

As shown in FIG. 4, according to the short-circuit protection method in the embodiment, firstly a peak current sampling signal of a secondary-side current is compared with a comparison circuit; if the secondary-side current significantly increases and exceeds a preset threshold, a driving control circuit compulsorily blocks a driving signal of the converter during a current interruption cycle, in addition, the driving control circuit pulls down the present internal retracted current-limiting point to a very small fixed value, i.e., it generates a given voltage signal with a fixed voltage value. A current-limiting loop action is carried out relying on an average current sampling signal, to pull up the present working frequency within two to three interruption cycles, thereby improving the present resonance impedance within a resonance cavity of the half-bridge resonance converter. Therefore, the primary side current and the secondary-side current will be steady at a very small limiting value, work in a hiccup state, thereby reaching short-circuit protection.

Figure 5:
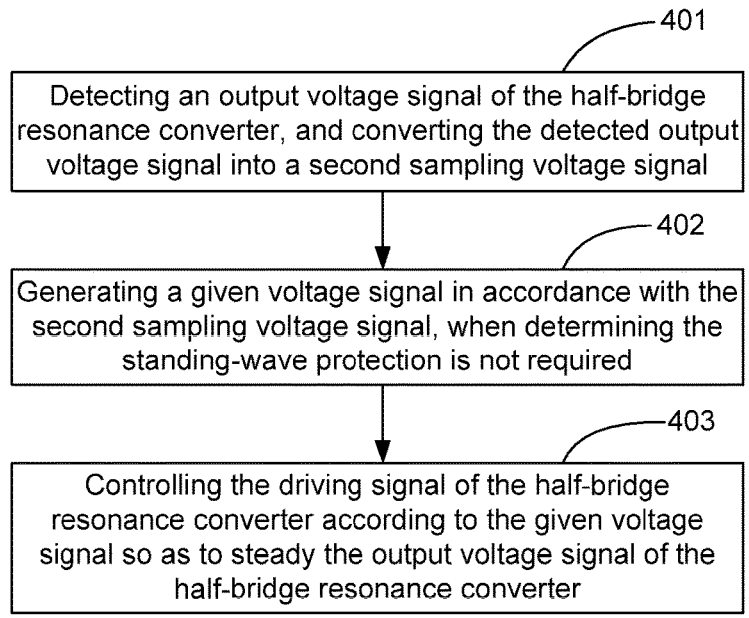
FIG. 5 is a processing flowchart when a converter does not require a cycle-by-cycle protection according to Embodiment one of the present disclosure.

The above description is for a specific short-circuit protection method when a cycle-by-cycle protection is required. A specific process of short-circuit protection method according to the embodiment in a situation that a cycle-by-cycle protection is not required is introduced below, as shown in FIG. 5:

step 401: an output voltage signal of the half-bridge resonance converter is detected, and the detected output voltage signal is converted into a second sampling voltage signal;

step 402: a given voltage signal is generated in accordance with the second sampling voltage signal, when it is determined that the cycle-by-cycle protection is not required; and step 403: the driving signal of the half-bridge resonance converter is controlled according to the given voltage signal so as to steady the output voltage signal of the half-bridge resonance converter.

Figure 6:
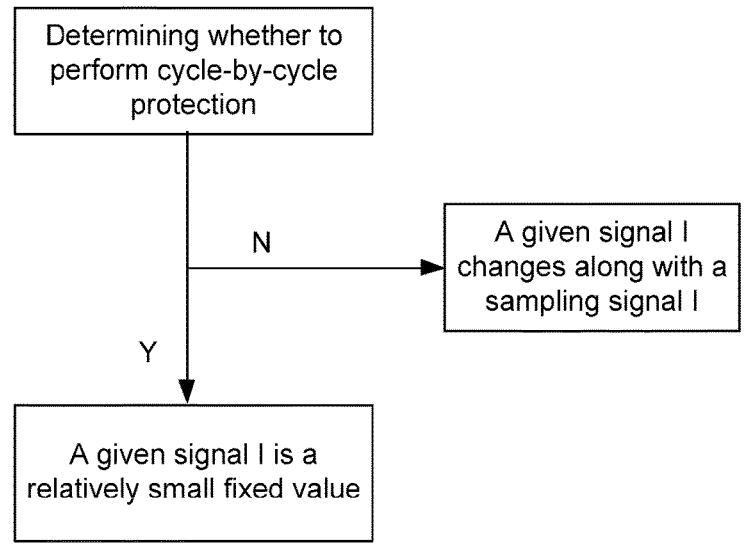
FIG. 6 is a schematic diagram of generating a given voltage signal according to Embodiment one of the present disclosure.

As shown in FIG. 6, the given voltage signal according to the embodiment is generally divided into two parts depending on whether to perform the cycle-by-cycle protection. If there is the cycle-by-cycle protection, a given voltage signal I is set with a very small fixed value, normally around several amperes. This value is a limited value of the output current when ultimately short-circuit protection is performed in a hiccup state, and moreover, the size of the value relates to an action speed of a retraction ring in a short-circuit situation. A key element of the embodiment is the setting of the fixed value, due to which the primary side current sampling can be omitted and the secondary-side current is employed for protection. In addition, when the short-circuit protection is open or there is no short-circuit fault, there is no cycle-by-cycle protection. The value of the given signal I may gradually increase along with increase of the output voltage until the output voltage reaches a steady value, at which moment the given signal I accordingly reaches an upper limit value. The process is carried out in the form of a certain curve. It is possible to draw different curves according to different performance requirements of the converter.

According to the short-circuit protection method in the embodiment, when the cycle-by-cycle protection is required, the output current may be limited to a relatively small value through the cycle-by-cycle protection and the fast current-limiting loop retraction. The advantage of doing so is that the converter will not turn off, or turn off and then reboot when overloading and short-circuit occur, instead, the converter works in a hiccup state, and stability is guaranteed in some degrees. When there is no need to carry out cycle-by-cycle protection, it is possible to steady the output current signal through the given current signal so as to enable the converter to quickly return to a regular process state.

The above process of acquiring a loop control signal according to the average voltage signal and the given voltage signal includes:

performing calculation and compensation processing on the average voltage signal and the given voltage signal to acquire the loop control signal.

According to the embodiment, the short-circuit protection method for a half-bridge resonance converter may block driving signals, PWMH and PWML, of the half-bridge resonance converter during one or a plurality of cycles, when the secondary-side current increases to a preset threshold. As shown in FIG. 4, the secondary-side current and the output current are decreased to not greater than a preset threshold so as to realize the short-circuit protection for the half-bridge resonance converter, and after one or many software cycles, the drive of the converter is rebooted. In addition, According to the short-circuit protection method in the embodiment, after the driving signal is blocked, the secondary-side current or the output current is limited through loop control, thereby further providing the short-circuit protection for the converter.

Embodiment Two

Figure 7:
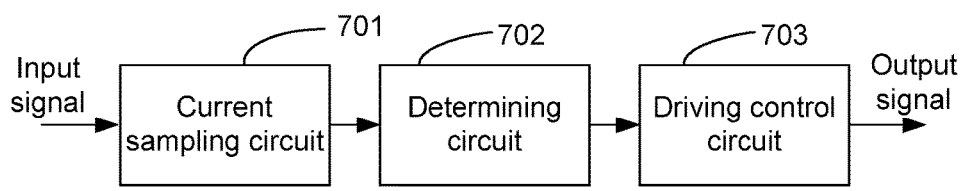
FIG. 7 is a schematic structural diagram of a first short-circuit protection device for a half-bridge resonance converter according to Embodiment two of the present disclosure.

As shown in FIG. 7, according to the embodiment, a short-circuit protection device for a half-bridge resonance converter is provided, including a current sampling circuit 701, a determining circuit 702 and a driving control circuit 703;

the current sampling circuit 701 is configured to detect a secondary-side current signal of the half-bridge resonance converter, and convert the detected secondary-side current signal into a first sampling voltage signal;

the determining circuit 702 is configured to determine whether a cycle-by-cycle protection is required in accordance with the first sampling voltage signal; and the driving control circuit 703 is configured to block a driving signal of the half-bridge resonance converter compulsorily during a preset cycle, when a determining result of the determining circuit is to require cycle-by-cycle protection.

As shown in FIG. 7, the short-circuit protection device does not use an original-side current sampling, but directly uses a secondary-side current sampling to realize the short-circuit protection. The current sampling circuit 701 carries out sampling on the secondary-side current of the converter. The determining circuit 702 determines whether a cycle-by-cycle protection is required in accordance with the sampling signal. When the cycle-by-cycle protection for the half-bridge resonance converter is required, and if the secondary-side current is significantly increasing and exceeds a preset threshold, the driving control circuit 703 may compulsorily block the driving signal of the converter during an interruption cycle to lower the secondary-side current, thereby realizing the short-circuit protection. Moreover, the secondary-side current sampling is necessary for all switching mode power supplies, therefore, the method according to the embodiment does not need original-side current sampling, but employs the secondary-side current sampling in the current switching mode power supply to realize the short-circuit protection, which does not need to add components at the primary side to realize the short-circuit protection by the primary side current sampling as needed in the prior art, thereby improving the power density.

Figure 8:
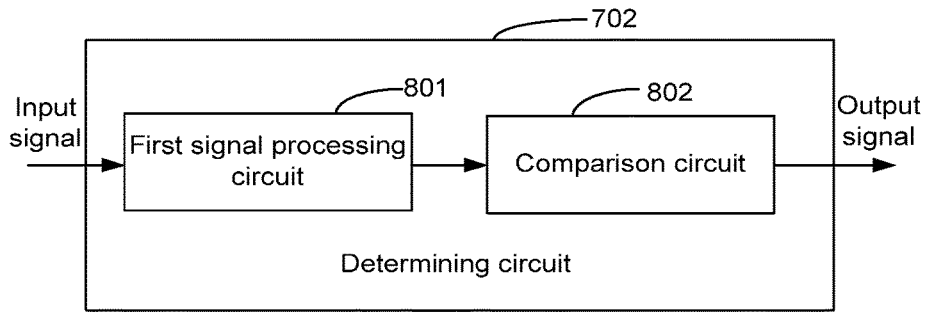
FIG. 8 is a schematic structural diagram of a determining circuit according to Embodiment two of the present disclosure.

As shown in FIG. 8, the determining circuit 702 in the short-circuit protection device for a half-bridge resonance converter according to the embodiment, includes a first signal processing circuit 801 and a comparison circuit 802;

the first signal processing circuit 801 is configured to perform difference and amplification processing on the first sampling voltage signal;

the comparison circuit 802 is configured to compare a voltage value of the first sampling voltage signal after the difference and amplification processing with a preset voltage value, and determine that the cycle-by-cycle protection is required, if the sampling voltage value processed by the processing sub-circuit is greater than the preset voltage value.

Figure 9:
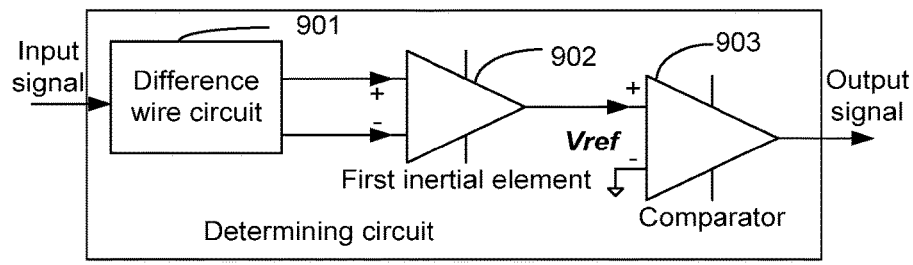
FIG. 9 is a schematic structural diagram of another determining circuit according to Embodiment two of the present disclosure.

As shown in FIG. 9, a determining module 702 according to the embodiment may be composed of a difference wire circuit 901, a first inertial element 902, and a comparator 903 in series. The first sampling voltage signal is processed through the difference wire circuit 901 and the first inertial element 902, and transmits the processed voltage signal to one end of the comparator 903. A preset voltage signal may be input to the other end of the comparator. The comparator 903 compares the processed voltage signal with the preset voltage signal to determine whether the cycle-by-cycle protection is required. According to the embodiment, the comparator may be a high-speed comparator with a reaction speed of an ns level, guaranteeing that when the cycle-by-cycle protection is triggered, the comparator rolls over within two to three interruption cycles, which may accurately and quickly control a driving pulse signal.

Figure 10:
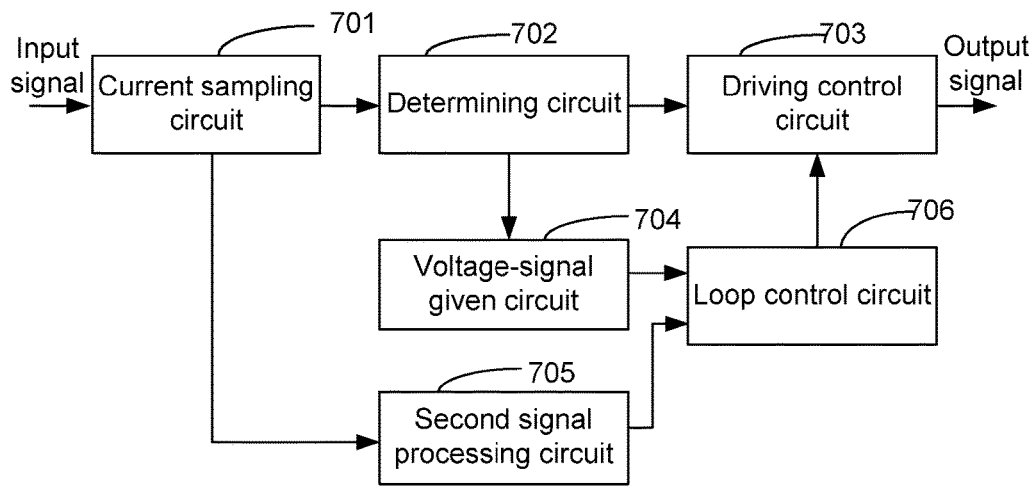
FIG. 10 is a schematic structural diagram of a second short-circuit protection device for a half-bridge resonance converter according to Embodiment two of the present disclosure.

As shown in FIG. 10, according to the embodiment, the short-circuit protection device further includes a voltage-signal given circuit 704, a second signal processing circuit 705 and a loop control circuit 706;

the second signal processing circuit 705 is configured to process the first sampling voltage signal and acquire an average voltage signal corresponding to an average secondary-side current signal;

the voltage-signal given circuit 706 is configured to generate a given voltage signal with a fixed voltage value, when the determining circuit 703 determines that cycle-by-cycle protection is required;

the loop control circuit 706 is configured to acquire a loop control signal according to the average voltage signal and the given voltage signal; and the driving control circuit 703 is further configured to control a size of the driving signal of the half-bridge resonance converter according to the loop control signal.

According to the short-circuit protection device in the embodiment, a peak current sampling signal of a secondary-side current is compared with a comparison circuit, and when the secondary-side current significantly increases and exceeds a preset threshold, the driving control circuit compulsorily blocks a driving signal of the converter during the current interruption cycle, in addition, as shown in FIG. 4, the driving control circuit pulls down the present internal retracted current-limiting point to a very small fixed value, carries out a current-limiting loop action according to an average current sampling signal, and pulls up the present working frequency during two to three interruption cycles, thereby improving the present resonance impedance within a resonance cavity of the half-bridge resonance converter, making the original-side current and the secondary-side current steady at a very small limiting value, working in a hiccup state, and realizing short-circuit protection. The advantage of doing so is that the converter will not turn off or the converter will not turn off and reboot when overloading and short-circuit occur, instead, the converter works in a hiccup state, and stability is guaranteed in some degrees.

Figure 11:
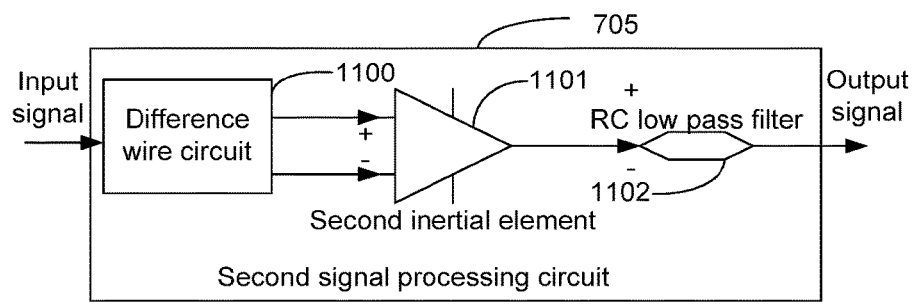
FIG. 11 is a schematic structural diagram of a second signal processing sub-circuit according to Embodiment two of the present disclosure.

As shown in FIG. 11, the second signal processing circuit 705 according to the embodiment may be composed of a difference wire circuit 1100, a second inertial element 1101, and a RC low pass filter 1102 in series. The average voltage signal corresponding to the average secondary-side current signal is acquired through the processing of the difference wire circuit 1100, the second inertial element 1101, and the RC low pass filter 1102.

Figure 12:
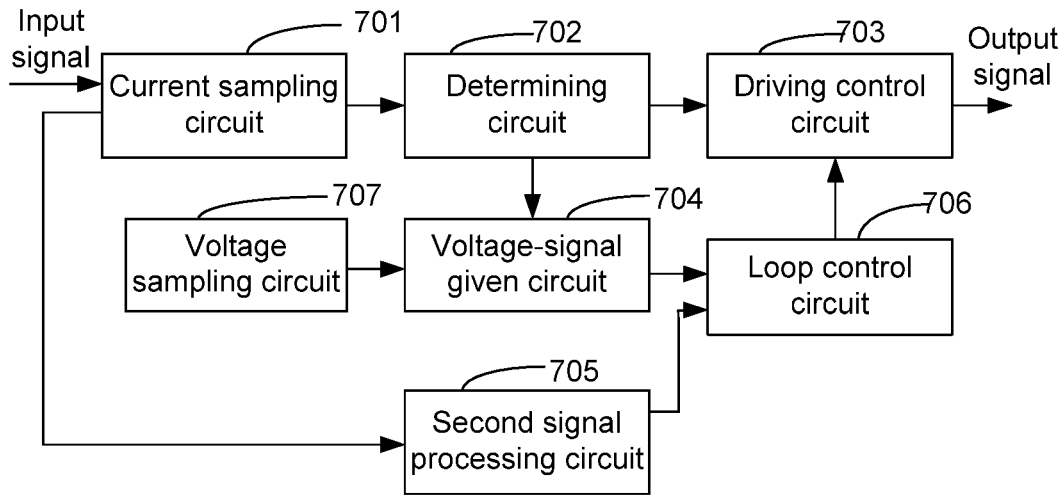
FIG. 12 is a schematic structural diagram of a third short-circuit protection device for a half-bridge resonance converter according to Embodiment two of the present disclosure.

As shown in FIG. 12, the short-circuit protection device according to the embodiment further includes a voltage sampling circuit 707;

the voltage sampling circuit 707 is configured to detect an output voltage signal of the half-bridge resonance converter, and convert the detected output voltage signal into a second sampling voltage signal;

the voltage-signal given circuit 704 is further configured to generate a given voltage signal according to the second sampling voltage signal, when a determining result of the determining circuit is that cycle-by-cycle protection is not required; and the driving control circuit 703 is further configured to control the driving signal of the half-bridge resonance converter according to the given voltage signal so as to steady the output voltage signal of the half-bridge resonance converter.

As shown in FIG. 6, the given voltage signal according to the embodiment is generally divided into two parts depending on whether to perform the cycle-by-cycle protection. If there is the cycle-by-cycle protection, a given voltage signal I is set with a very small fixed value, normally around several amperes. This value is a limited value of the output current when ultimately short-circuit protection is performed in a hiccup state; in addition, the size of this value relates to an action speed of a retraction ring when in a short-circuit situation. A key element of the embodiment is the setting of the fixed value, due to which the primary side current sampling can be omitted and the secondary-side current is employed for protection. In addition, when the short-circuit protection is open or there is no short-circuit fault, there is no cycle-by-cycle protection. The value of the given signal I may gradually increase along with increase of the output voltage until the output voltage reaches a steady value, at which moment the given signal I accordingly reaches an upper limit value. The process is carried out in the form of a certain curve. It is possible to draw different curves according to different performance requirements of the converter.

Figure 13:
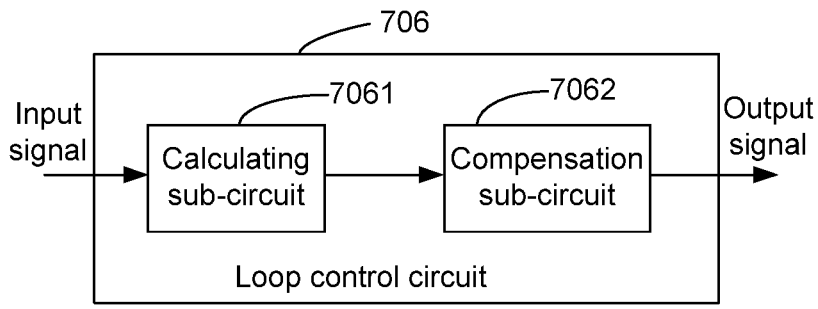
FIG. 13 is a schematic structural diagram of a loop control circuit according to Embodiment two of the present disclosure.

As shown in FIG. 13, the loop control circuit 706 according to the embodiment includes a calculating sub-circuit 7061 and a compensation sub-circuit 7062;

the calculating sub-circuit 7061 is configured to calculate the average voltage signal and the given voltage signal and to transmit voltage signals after calculation to the compensation sub-circuit; and the compensation sub-circuit 7062 is configured to perform compensation processing on the voltage signals after calculation to acquire a loop control signal.

The loop control circuit 706 acquires an output frequency of a power tube and a pulse width value through calculations of the calculating sub-circuit 7061 and the compensation sub-circuit 7062, and to control the turn-on and turn-off of the power tube through the driving circuit.

According to the embodiment, the function of detecting original-side current is implemented completely depending on secondary-side current. Since a delay exists when a current is transmitted to the secondary side and converted to a digital signal, higher demands are made on a sampling circuit and a loop circuit.

Firstly in terms of the processing of the sampling circuit, an input of a communication power supply is a bus voltage of around 400V, an output thereof is 48V or 53.5V; a turn ratio of original-side to secondary-side of the converter in terms of a half-bridge LLC topology normally is around 4, hence, in view of a same power level, a relationship between the secondary-side current and the primary side current is $Is=4*Ip$. In addition, considering an efficiency indicator, a sampling resistance value of the output current sampling has to be as small as possible, in order to reduce a loss.

Normally, the sampling resistance value of the output current sampling is between a quantitative range of 1-2 milliohm. An acceptable range of a digital controller is between 0-3V. Therefore, considering that amplification factors of two-branch samplings differ quite a lot from each other, it is appropriate to realize amplification and filtering of the average-value current sampling and the peak-value current sampling through two amplifiers.

Secondly, using two amplifiers is suitable to adjust respective parameters, leading to strong flexibility. Meanwhile, as shown in FIG. 9 and FIG. 11, integral parameters of the first inertial element 902 and the second inertial element 1101 differ from each other. The first inertial element involves the peak-value current sampling, it is therefore necessary to accurately reflect a waveform instantaneous value of an actual current of the secondary side. An integral capacitance of the first inertial element must be small (around dozens of pF). In addition, for the sake of an anti-jamming effect, the integral capacitance must be kept. However, since the second inertial element involves an average-value current sampling, it plays a part in limiting currents, monitoring and displaying, current sharing and so on; since a smoothing treatment is performed on the waveform, an anti-jamming capability is relatively strong and an integral constant has to be bigger (in general around 1000 pF). Meanwhile, the two inertial elements set amplification factors by themselves according to actual conditions and a required working range, as long as guaranteeing that waveforms do not affect regular short-circuit protection.

In addition, requirements on amplifiers are high speed, high precision and high bandwidth. If it is an amplifier of a single power supply, it is necessary to add a direct current (DC) bias element to increase one DC bias for the signal as a whole, in order to improve the anti-jamming performance. Meanwhile, a sampling wire of the current signal uses a difference wire, in order to provide anti-jamming effect and improve accuracy of the signal.

Furthermore, using a PI compensation controller with a single zero point and a single pole point as an example, a formula of calculating an output frequency of the power tube by the PI compensation controller with the single zero point and the single pole point is shown as follows:

$$u(t)=K_p e(t)+K_i \int e(t)dt$$

A digital PI controlling equation is acquired through discretization of a PI controlling equation. The digital PI can be divided into two types, a position mode and an incremental mode, in accordance with the difference of discrete modes.

According to the present disclosure, a digital incremental-mode PI is exemplified, where an incremental-mode PI formula is shown as follows:

$$u(k)=K_p[e(k)-e(k-1)]+K_i e(k)+u(k-1)$$

where $u(k)$ is output of PI in the current cycle, i.e., an output frequency of the power tube; $u(k-1)$: output of PI in the last operation cycle; $e(k)$: an error between a given value and an output value in the current cycle; $e(k-1)$: an error between an given value and an output value in a last cycle; $K_p$ and $K_i$ are PI parameters.

Furthermore, it should be noted that, according to the control method in the embodiment of the present disclosure, the above mentioned compensation controller is exemplified as the PI controller with a single zero point and a single pole point. The present disclosure is not limited thereto. The present disclosure may use other compensation network controllers, such as a double-zero-point-and-single-pole-point compensation controller, a double-zero-point-and-double-pole-point compensation controller, and a single-zero-point-and-double-pole-point compensation controller.

Figure 14:
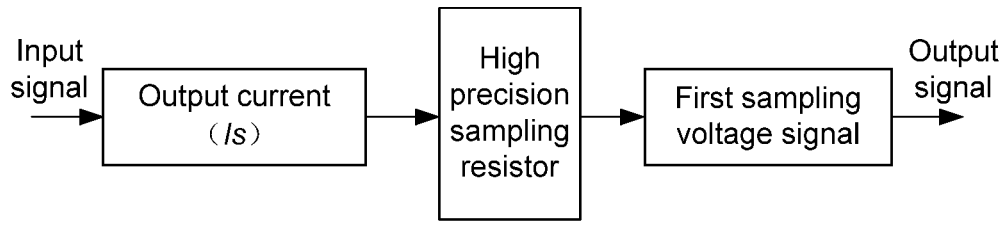
FIG. 14 is a schematic diagram of converting a first sampling voltage signal according to Embodiment two of the present disclosure.
Figure 15:
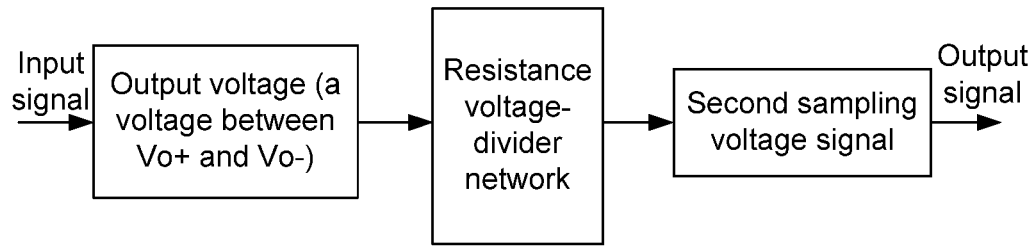
FIG. 15 is a schematic diagram of converting a second sampling voltage signal according to Embodiment two of the present disclosure.

According to the embodiment, the voltage sampling circuit 707 may be a resistant network, and the current sampling circuit 701 may be a high-precision sampling resistor. As shown in FIG. 14 and FIG. 15, a secondary-side current signal of the half-bridge resonance converter is detected, and a detected output voltage signal is converted into a second sampling voltage signal through a resistance potential-divider network; and the detected secondary-side current signal is converted into a first sampling voltage signal through a sampling resistor.

According to the embodiment, the short-circuit protection device may compulsorily pull a given value of a retraction ring to a relatively small fixed value within one to two interruption cycles after triggering the cycle-by-cycle protection of the peak value current, in order to accelerate the retraction ring to drops out of saturation. In this way, after the cycle-by-cycle protection is carried out, a current-limiting retraction ring may be quickly switched within two to three interruption cycles to limit the output current, thereby limiting the primary side current so as to complete the short-circuit protection.

The above description further describes the present disclosure in detail in combination with explicit embodiments. It should not be appreciated that the present disclosure is solely limited to the above description. For those skilled in the art, numerous simple deductions or replacements can be made without departing from the conception of the present disclosure, all of which shall be regarded as belonging to the protection scope of the present disclosure.

What is claimed is:

1. A method for short-circuit protection for a half-bridge resonance converter, comprising:
   detecting a secondary-side current signal of the half-bridge resonance converter by using a device located at a secondary side of the half-bridge resonance converter;
   converting the secondary-side current signal into a first sampling voltage signal;
   determining whether a cycle-by-cycle protection is required in accordance with the first sampling voltage signal; and
   compulsorily blocking a driving signal of the half-bridge resonance converter during a preset cycle when the cycle-by-cycle protection is required,
   wherein the determining whether the cycle-by-cycle protection is required in accordance with the first sampling voltage signal comprises:
   performing difference and amplification processing on the first sampling voltage signal;
   comparing a voltage value of the first sampling voltage signal after the difference and amplification processing with a preset voltage value; and
   determining that the cycle-by-cycle protection is required when the voltage value of the first sampling voltage signal after the difference and amplification processing is greater than the preset voltage value,
   wherein the method further comprises:
   processing the first sampling voltage signal and acquiring an average voltage signal corresponding to an average secondary-side current signal;
   generating a given voltage signal with a fixed voltage value when determining that the cycle-by-cycle protection is required in accordance with the first sampling voltage signal;

acquiring a loop control signal according to the average voltage signal and the given voltage signal; and controlling a size of the driving signal of the half-bridge resonance converter according to the loop control signal.

2. The method according to claim 1, further comprising:

detecting an output voltage signal of the half-bridge resonance converter, and converting the output voltage signal into a second sampling voltage signal;

generating the given voltage signal in accordance with the second sampling voltage signal when determining the cycle-by-cycle protection is not required; and controlling the driving signal of the half-bridge resonance converter according to the given voltage signal so as to steady the output voltage signal of the half-bridge resonance converter.

3. The method according to claim 1, wherein the acquiring the loop control signal according to the average voltage signal and the given voltage signal comprises:

performing calculation and compensation processing on the average voltage signal and the given voltage signal, and acquiring the loop control signal.

4. A short-circuit protection device for a half-bridge resonance converter, comprising:

a current sampling circuit, located at a secondary side of the half-bridge resonance converter and configured to detect a secondary-side current signal of the half-bridge resonance converter and convert the secondary-side current signal into a first sampling voltage signal;

a determining circuit configured to determine whether a cycle-by-cycle protection is required in accordance with the first sampling voltage signal; and a driving control circuit configured to compulsorily block a driving signal of the half-bridge resonance converter during a preset cycle when the determining circuit determines that the cycle-by-cycle protection is required, wherein the determining circuit comprises:

a first signal processing circuit configured to perform difference and amplification processing on the first sampling voltage signal; and a comparison circuit configured to compare a voltage value of the first sampling voltage signal after the difference and amplification processing with a preset voltage value, and determine that the cycle-by-cycle protection is required when the voltage value of the first sampling voltage signal processed by the first signal processing circuit is greater than the preset voltage value, wherein the short-circuit protection device further comprises:

a second signal processing circuit configured to process the first sampling voltage signal and acquire an average voltage signal corresponding to an average secondary-side current signal;

a voltage-signal given circuit configured to generate a given voltage signal with a fixed voltage value when the determining circuit determines that the cycle-by-cycle protection is required; and a loop control circuit configured to acquire a loop control signal according to the average voltage signal and the given voltage signal;

wherein the driving control circuit is further configured to control a size of the driving signal of the half-bridge resonance converter according to the loop control signal.

5. The short-circuit protection device according to claim 4, further comprising a voltage sampling circuit configured to detect an output voltage signal of the half-bridge resonance converter and convert the output voltage signal into a second sampling voltage signal; wherein the voltage-signal given circuit is further configured to generate the given voltage signal according to the second sampling voltage signal when the determining circuit determines that the cycle-by-cycle protection is not required; and the driving control circuit is further configured to control the driving signal of the half-bridge resonance converter according to the given voltage signal so as to steady the output voltage signal of the half-bridge resonance converter.

6. The short-circuit protection device according to claim 4, wherein the loop control circuit further comprises:

a calculating sub-circuit configured to calculate the average voltage signal and the given voltage signal; and a compensation sub-circuit configured to perform compensation processing on the voltage signals after the calculation and to acquire the loop control signal, wherein the calculating sub-circuit transmits voltage signals after the calculation to the compensation sub-circuit.

* * * * *